United States Patent [19]

Herget

[11] Patent Number: 4,533,958
[45] Date of Patent: Aug. 6, 1985

[54] METHOD OF TRANSMITTING SERIAL DATA BETWEEN FACSIMILE EQUIPMENT AND INTERFACE PERFORMING THE SAME

[75] Inventor: Werner Herget, Munich, Fed. Rep. of Germany

[73] Assignee: Siemens Aktiengesellschaft, Berlin and Munich, Fed. Rep. of Germany

[21] Appl. No.: 506,967

[22] Filed: Jun. 23, 1983

[30] Foreign Application Priority Data

Aug. 10, 1982 [DE] Fed. Rep. of Germany ....... 3229777

[51] Int. Cl.³ .......................... H04N 1/40; H04N 1/04
[52] U.S. Cl. ..................... 358/280; 358/286; 358/287; 340/347 DD; 343/55 C
[58] Field of Search ............... 358/280, 286, 287, 294; 340/347 DD; 343/55 C

[56] References Cited

U.S. PATENT DOCUMENTS

| | | | |
|---|---|---|---|
| 3,729,584 | 4/1973 | de Vos et al. | 358/280 |
| 3,849,592 | 11/1974 | Rosenheck | 358/261 |
| 4,048,657 | 9/1977 | Kmith | 358/285 |
| 4,068,266 | 1/1978 | Liao | 358/280 |
| 4,081,843 | 3/1978 | Okano | 358/280 |
| 4,288,820 | 9/1981 | Minamibayashi et al. | 358/294 |
| 4,402,015 | 8/1983 | Yamada | 358/280 |

OTHER PUBLICATIONS

Analog–Digital Conversion Handbook; The Engineering Staff of Analog Devices, Inc.; Jun. 1972; pp. I-64-I--65.

Primary Examiner—Howard W. Britton
Assistant Examiner—John K. Peng
Attorney, Agent, or Firm—Thomas H. Jackson

[57] ABSTRACT

A method of transforming serial binary data exchanged between facsimile transceivers having different horizontal resolutions. Binary signal elements representing a scanning line are separated into a sequence of n bit data words and the number and type of subsequent bit changes within each data word is derermined. A conicident sequence of m bit data words is generated such that the bit pattern of each corresponding n bit data word substantially is reproduced by arbitrarily padding of an insignificant bit if n<m and by dropping of an insignificant bit, respectively if n>m; wherein n:m corresponds to the ratio of the transceiver resolutions. The serial data stream is reproduced from the sequence of said second data words and transmitted to the receiving facsimile transceiver for recording.

11 Claims, 1 Drawing Figure

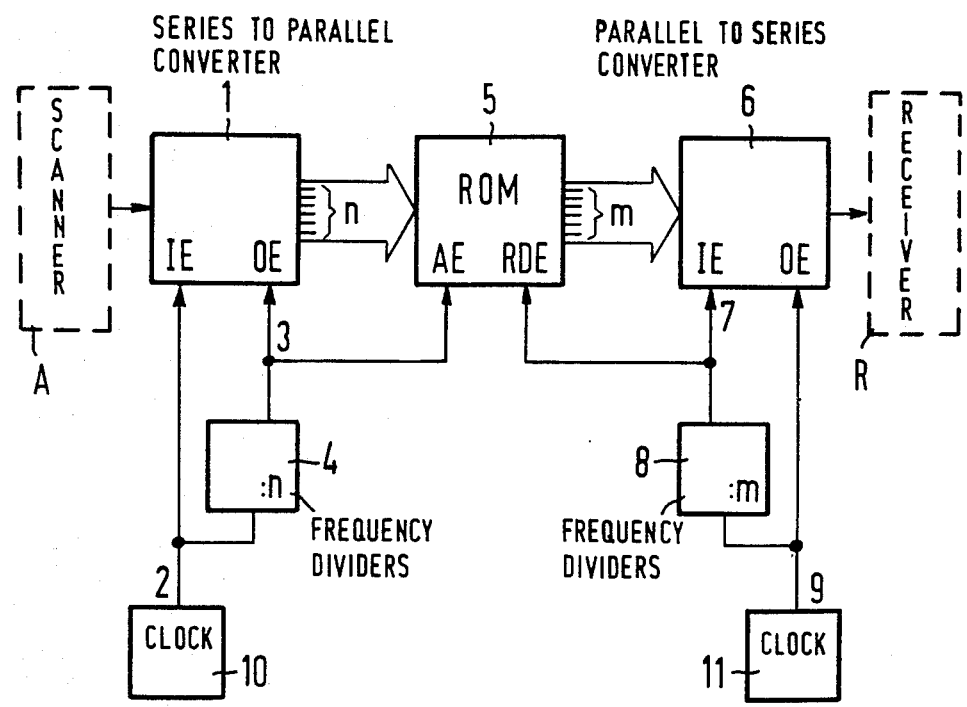

METHOD OF TRANSMITTING SERIAL DATA BETWEEN FACSIMILE EQUIPMENT AND INTERFACE PERFORMING THE SAME

BACKGROUND OF THE INVENTION

The invention relates to a method of transforming binary coded data for use with exchanging a serial data stream between a transmitting and a receiving facsimile transceiver and to a circuit arrangement performing such method. More specifically, the invention relates to a method of interfacing cross-connected facsimile transceivers having incompatible characteristics of horizontal resolution.

Known facsimile equipment is designed as transceiver terminals having a transmitter section which scans an original document line by line. During such line scanning operation the document is illuminated dot by dot by a light source. The light source, an optical system and a sensor are arranged on a carriage moving to and fro, while the document is transported in vertical direction after every forward and backward movement of the carriage. The electro-optical sensor converts the reflected light into binary encoded signal elements which correspond to respective black and white image elements on the document. The scanning method results in a serial data stream of such binary signal elements transmitted across a transmitting channel, usually a temporarily established channel of a telecommunication network, to a cross-connected receiving facsimile transceiver. This transceiver includes a recording section where, in turn, the data received in series control a printing operation accordingly performed line by line in order to reproduce a copy of the original document.

In accordance with the two-dimensional characteristic of the original and the reproduced copies the scanning and the recording processes have two degrees of freedom, i.e. specific horizontal and vertical resolutions. The vertical resolution is determined by the number of scanning lines per inch and the horizontal resolution is specified by the number of scanning elements and recording elements, respectively contained in a line. In other words, during the scanning operation each line is separated into a series of binary signal elements having two possible states each corresponding to a black image element and a white image element, respectively. Apparently, a cross-connected pair of facsimile receivers exchanging data have to operate in synchronism with respect to these two degrees of freedom in order to be capable of reproducing a true copy of the scanned original document.

In conjunction with recent improvements and increased possibilities of utilizing existing public networks for transmitting digital data information concerning graphical data facsimile transceivers have become more standardized and limitations in usage resulting from incompatible vertical resolution have been overcome to a reasonable degree. Other improvements, e.g. with respect to electro-optical sensors for use with scanning units of facsimile transceivers have made it possible to increase the horizontal resolution previously employed with the restraint of the loss of compatibility with older equipment.

It is conceivable to overcome this limitation by utilizing a method of aligning the operation of facsimile transceivers with different horizontal resolution. Such alignment could be achieved by interrogating the binary signal elements furnished by the transmitting transceiver with a first frequency as predetermined by the scanning operation by means of an evaluating signal of a second frequency which is predetermined by the recording operation of the receiving facsimile transceiver. The resulting output signal varying with the second frequency represents binary signals having a first state if a rising edge of the evaluating signal coincides with the corresponding first state of the binary signal contained in the data stream received from the transmitting transceiver. Correspondingly, the second states of the output signal are derived. The second frequency may be higher or lower than the first frequency in dependence upon the ratio of the horizontal resolutions of the receiving transceiver and the transmitting transceiver.

Such a conceivable method of aligning two facsimile transceivers having different horizontal resolutions has the disadvantage that rapid changes of the binary values in the serial data stream may not be exactly reproduced. Isolated changes of status may be slipped if the second frequency is lower than the first frequency, or the incidental phase difference between the first and the second frequency can suppress a discrimination of the change of status of the original binary signal. In other words, such evaluating measure reduces the information contents of the original serial data stream wherein the information contents are determined by the number and type of signal changes between the two possible states of subsequent binary signal elements.

SUMMARY OF THE INVENTION

It is, therefore, a main object of the invention to provide for an improved method of transforming binary encoded data for use with exchanging such data between transmitting and receiving facsimile transceivers having different horizontal resolution.

It is a further object of the present invention to provide such a method which allows for a data transformation in such a manner that the loss of information contents occurring during such data transformation is minimized.

These objects, as well as other objects which will become apparent from the description which follows are achieved by a method of transforming binary encoded data including the step of receiving the serial data stream generated by the transmitting facsimile transceiver while scanning an original document. The binary signal elements commonly representing a scanning line are then separated into a sequence of first data words each composed of n bits. Each first data word is evaluated by determining the number and type of subsequent bit changes within the word. A coincident sequence of second data words each composed of m bits is generated such that the original bit pattern of a corresponding first data word is substantially reproduced by arbitrarily padding of an insignificant bit if the resolution of the receiving facsimile transceiver is higher and consequently n is lower than m and by arbitrarily dropping of an insignificant bit, respectively if the resolution of the transmitting transceiver is higher and consequently n is higher than m. From this sequence of the second data words a serial data stream is reproduced and transmitted to the receiving facsimile transceiver for recording the respective image elements onto a copy document.

As will be realized an optimum of alignment is achieved by separating the serial data steam to be transformed into entities of limited length, i.e. each of the first data words is evaluated separately. As compared to the mentioned interrogating method no slippage because of shifting phases can occur. Another advantage is that this method can be easily implemented by means of a circuit arrangement forming an interface between transmitting and receiving transceiver as may be depicted from preferred embodiments of the invention. It is a systematic and inherent limitation that the data stream of lower resolution has less information contents than the data steam of higher resolution, and some loss is unavoidable when transforming data from a stream of high resolution into one of lower resolution. However, this loss is minimized and the necessary compatability is achieved which allows for a cooperation between transceivers of different design. On the other hand, an optimum of alignment is reached when the data transformation is transformed in the direction from lower to higher resolution. From a systematic point of view such solution is the most desired compromise for a cooperation between equipment of different design characteristics.

BRIEF DESCRIPTION OF THE DRAWING

The only FIGURE of the drawings shows schematically a block diagram of a circuit arrangement designed as an interface between two facsimile transceivers each having a different horizontal resolution. This circuit arrangement represents the hardware for implementing a method of transforming binary encoded data in accordance with the present invention.

DESCRIPTION OF THE PREFERRED EMBODIMENT

Facsimile equipment is well known in the art and detailed description of the scanning unit and the recording unit, respectively of a facsimile transceiver is therefore deemed not to be necessary. Accordingly, the block diagram shown in the drawing illustrates but blocks represented in broken lines for a scanner A and a receiver R each forming a section of a transmitting facsimile transceiver and of a receiving facsimile transceiver, respectively. In addition, also a transmission channel cross-connecting the two transceivers temporarily, e.g. through a public network is not included since details of the respective circuitry have no bearing in conjunction with the present invention.

It is assumed that scanner A furnishes a serial stream of binary encoded data which represents line by line graphical information contained on a document. This serial data stream is received at a serial input of a series to parallel converter 1. A first clock pulse generator 10 which may be implemented in a conventional manner is provided for generating an input clock pulse train 2 having a pulse frequency which corresponds to the scanning frequency of the transmitting facsimile transceiver. It may be recognized that measures can be taken to run this first clock pulse generator in synchronism with the scanning operation of the scanner A of the transmitting facsimile transceiver. The first clock pulse train 2 controls the input operation of the series to parallel converter 1. In addition, a first frequency divider circuit 4 is provided which is connected to receive this first clock pulse train in order to derive therefrom a second clock pulse train 3. The ratio of the first clock pulse train 2 and the second clock pulse train 3 is 1:n under the assumption that the series to parallel converter 1 comprises n parallel output elements. Correspondingly, the second clock pulse train 3 is furnished to this converter 1 for controlling of an output operation.

The function of the series to parallel converter in conjunction with the described time control signals is to format the serial data stream of binary encoded signal elements into fields of equal length predetermined by the number of output elements of the converter and herein after referred to as first data words.

The serial to parallel converter 1 outputs the n bits of one first data word in parallel which are received at address inputs of a memory unit 5 preferably designed as a read only memory. An address selection is enabled by furnishing the second clock pulse train 3 to an address enable input AE of memory unit 5.

A memory location selected by a first data word contains a respective one of second data words being composed of m bits. The read operation from memory unit 5 is performed under control of a second clock pulse generator 11 which runs in synchronism with the recording operation of the recording unit R of the receiving facsimile transceiver and generates a third clock pulse train 9. This clock pulse train is received at a second frequency divider circuit 8 designed for deriving a fourth clock pulse train 7. The ratio of the fourth clock pulse train 7 and the third clock pulse train 9 is 1:m as indicated at the second frequency divider 8. This fourth clock pulse train 7 is furnished to a read enable input RDE of the memory unit 5 in order to control the read operation.

Accordingly, in synchronism with the fourth clock pulse train 7 a first data word selected as described before is read out and furnished in parallel to a parallel to series converter 6. This converter is enabled to receive the supplied second data word under control of the fourth clock pulse train 7 and outputs the individual m signal elements of the received second data word in series under control of the third clock pulse train 9. It is conceivable that the entire circuit arrangement can be designed such that the second clock pulse train 3 and the fourth clock pulse train 7 preferably have the same frequency which allows for a simplified structure of the memory unit 5 and eliminates the need of additional latches in order to arrange for overlapping of address selection and read operations. This concept also avoids synchronizing problems with respect to input and output conditions of the interface circuit arrangement.

The operation of this interface circuit arrangement will be described in more detail in the following with reference to an actual application. In accordance with CCITT recommendations, standards for facsimile equipment have been established which distinguish between facsimile transceivers of group 3 and those of group 2. As far as here of concern facsimile transceivers with characteristics implemented in accordance with group 3 recommendations have a horizontal resolution of 1728 bits per line whereas group 2 facsimile transceivers have a different resolution of 1400 bits per line. Apparently, a data transformation has to be performed if transceivers of group 3 and group 2, respectively shall cooperate and exchange data. The general concept is to form such data transformation, especially in the direction from high to low resolution, with the lowest possible loss of information contents, i.e. the method of transforming the data shall provide for means which allow to reproduce possiby all changes of the status of the signal elements in the data stream in order to save all black-to-white and white-to-black transitions of image elements.

The solution is to separate the serial data streams corresponding to a scanning line of 1400 bits and 1728 bits, respectively into sequences of first and second data words whereby the numbers of first and second data words corresponding to a respective scanning line are identical whereas the lengths of the data words are different. In the given example, the ratio of the high resolution and the low resolution is about 1.25 and consequently perferably the ratio of n:m=5:4. It can easily be calculated that given a resolution of 1728 bits per line and a format of 5 bits per data word result in a sequence of 345.6 first data words per line. Accordingly, the corresponding sequence of second data words comprising 4 bits each includes 350 second data words when the resolution is 1400 bits per line. The resulting systematic failure, i.e. the mismatch in the number of first and second data words per sequence amounts to 1.26%. This failure rate falls within the tolerance of facsimile transceivers of group 2 and does only have an insignificant bearing.

In accordance with the alignment ratio of 5:4 bits with respect to transmitting and receiving resolution the dividing factors of the first frequency divider 4 and the second frequency divider 8, respectively are determined. The dividing factor of the former is n=5 and of the latter is m=4.

Consequently, the layout of the memory unit 5 is also specified by these factors. In the given example a read only memory circuit of 32 times 4 bits will suffice for transforming any possible combination of a 5 bit first data word into a 4 bit second data word. The layout of an accordingly implemented memory unit is illustrated in the represented table listing consecutively the addresses of all 32 memory locations being identical to a respective one of the first data words and the respective transform that is the contents of each memory location being identical to a respective one of the second data words.

TABLE

| MEMORY ADDRESS (n Bits) | MEMORY LOCATION (m Bits) |
|---|---|
| 00000 | 0000 |
| 00001 | 0001 |
| 00010 | 0010 |
| 00011 | 0011 |
| 00100 | 0010 |
| 00101 | 0101 |
| 00110 | 0110 |
| 00111 | 0111 |
| 01000 | 0100 |
| 01001 | 0101 |
| 01010 | 0101* |
| 01011 | 0101 |
| 01100 | 0110 |
| 01101 | 0101 |
| 01110 | 0110 |
| 01111 | 0111 |
| 10000 | 1000 |
| 10001 | 1001 |
| 10010 | 1010 |
| 10011 | 1011 |
| 10100 | 1010 |
| 10101 | 1010* |
| 10110 | 1010 |
| 10111 | 1011 |
| 11000 | 1100 |
| 11001 | 1001 |
| 11010 | 1010 |
| 11011 | 1101 |
| 11100 | 1110 |
| 11101 | 1101 |
| 11110 | 1110 |
| 11111 | 1111 |

From a closer comparison of both the first data words and the corresponding second data words it may be recognized that the second data words are truncated with respect to the corresponding first data words. However, the original bit pattern of corresponding data words is substantially reproduced with the understanding that consecutive binary elements of identical status bear only insignificant information and that such a series can be reduced by dropping one of these consecutive bits in order to achieve the desired reduction of the data format. There are only two bit combinations identified by "*" where an unavoidable information loss occurs in conjunction with very rapid status changes of consecutive binary signal elements. In these cases the reduced data format is too small for reproducing the intput pattern exactly. The result of this information loss is a corresponding blur of the reproduced copy as compared to the image on the original document. For practical reasons, however, this small loss can still be accepted since the lower horizontal resolution of facsimile equipment of group 2 systematically has to allow for a higher tolerance.

Having described one embodiment of an interface circuit arrangement in conjunction with the block diagram shown in the drawing, it will become apparent to those skilled in the art that only conventional and commercially available circuits which are well known in the art are utilized for implementing such arrangement, further, even more detailed description of the employed circuits as such is therefore deemed not to be necessary.

The above described embodiment is designed for performing data transformation in conjunction with a transmitting facsimile transceiver having higher horizontal resolution than the receiving facsimile transceiver which is the more critical case since a minimum of information loss, as described, is unavoidable. If a data transformation for exchanging data between a facsimile transceiver of lower horizontal resolution and a facsimile transceiver of lower resolution has to be performed, the described method can achieve even better results. In this case an optimum of alignment is made possible. As far as the hardware implementation is concerned, only one significant change has to be made which is related to the layout of the memory unit 5. In such a case the memory address will be composed of data words of m bits and the memory location has a length of n bits. The contents of the read only memory can again be easily derived from the contents of the table described above simply by exchanging the two columns, i.e. the relationship between respective pairs of first and second data words remains unchanged. What actually happens by means of a data transformation in this direction is that an insignificant bit is padded whereby the term "insignificant bit" here means a bit bearing no substantial information, e.g. a bit within a consecutive series of bits of identical status. Since such series occur in the data words at random, it may be understood that such padding bits are added arbitrarily with respect to the location in the data word and may either have a first state or a second state depending upon the states of the neighboring bits in the data word.

There has thus been shown and described a novel method of transforming binary encoded data for use with exchanging such data between transmitting and receiving facsimile transceivers and an interface circuit arrangement implementing such method which method and implementation fulfill all the objects and advantages sought therefor. Many changes, modifications variations and other uses in applications of the subject invention will, however, become apparent to those skilled in the art after considering the specification and the accompanying drawing which disclose a preferred embodiment thereof. Whereas the formating of the serial data stream generated by the transmitting facsimile transceiver is an essential feature of the invention, it may be understood that the described formats of the first and second data words represent but one possibility, any other breakdown derived from the ratio of the higher and lower resolutions could be employed. However, it is of advantage if the difference in length of the first and second data words is kept reasonably small in order to limit the unavoidable information loss with respect to critical bit combinations. It may be also apparent that depending upon the implementation of the data transmission procedure and the location of the interface circuit arrangement changes may be made with respect to deriving the necessary time control signals. For example, instead of utilizing separate clock generators within the interface circuit arrangement the respective frequency signals could be derived from the master clock of a respective one of the facsimile transceivers when this circuit arrangement is designed as an add-on unit of the respective receiver. All such changes, modifications, variations and other uses in applications which do not depart from the spirit and scope of the invention are deemed to be covered by the invention which is limited only by the claims which follow.

What is claimed is:

1. A method of transforming binary encoded data being exchanged in form of a serial data stream between a transmitting and a receiving facsimile transceiver both having different horizontal resolutions, said method comprising the steps of:
   (a) receiving the serial data stream generated by the transmitting facsimile transceiver while scanning an original document line by line;
   (b) separating subsequent portions of the data stream each representing a scanning line into a respective sequence of first data words each composed of n bits;
   (c) evaluating the bit pattern of each first data word by determining the number and type of subsequent bit changes thereof;
   (d) deriving therefrom a coincident sequence of second data words each composed of m bits by reproducing substantially said bit pattern of each corresponding first data word while arbitrarily padding of an insignificant bit if the resolution of the receiving facsimile transceiver is higher and consequently n is lower than m and by arbitrarily dropping of an insignificant bit, respectively if the resolution of the transmitting transceiver is higher and consequently n is higher than m, whereby n:m corresponds to the ratio of the different horizontal resolutions; and
   (e) forming a serial stream of transformed data from the sequence of said second data words and transmitting the same to the receiving facsimile transceiver.

2. An interface ciruit arrangement for transforming binary encoded data being exchanged in form of a serial data stream between a transmitting and a receiving facsimile transceiver both having different horizontal resolutions, and circuit arrangement comprising:
   means for receiving the serial data stream generated by the transmitting facsimile transceiver while scanning an original document and for separating subsequent portions of the data stream each representing a scanning line into a respective sequence of first data words each composed of n bits;
   means for evaluating the bit pattern of each first data word by determining the number and type of subsequent bit changes thereof;
   means for deriving therefrom a coincident sequence of second data words each composed of m bits by reproducing substantially said bit pattern of each corresponding first data word while arbitrarily padding of an insignificant bit if the resolution of the receiving facsimile transceiver is higher and consequently n is lower than m and by arbitrarily dropping of an insignificant bit, respectively if the resolution of the transmitting transceiver is higher and consequently n is higher that m, whereby n:m corresponds to the ratio of the different horizontal resolutions; and
   means for forming a serial stream of transformed data from the sequence of said second data words and transmitting the same to the receiving facsimile transceiver.

3. The interface circuit arrangement as recited in claim 2, wherein said receiving and separating means comprise a series to parallel converter having a serial input connected to receive said serial data stream and having n parallel outputs.

4. The interface circuit arrangement as recited in claim 3, wherein said receiving and separating means further comprise:
   means for generating a first clock pulse train having a first pulse frequency being substantially identical to the frequency of the received serial data stream, said first clock pulse generating means being connected to furnish input control pulses to said series to parallel converter; and
   means for generating a second clock pulse train having a second clock pulse frequency being equal to 1/nth of the first pulse frequency, said second clock pulse generating means being connected to said series to parallel converter for supplying output control pulses.

5. The interface circuit arrangement as recited in claim 4, wherein said evaluating means and said means for deriving a sequence of second data words commonly comprise a memory unit having n selective address inputs connected to receive first data words consecutively, a corresponding plurality of storage locations each storing a respective one of the second data words, and m data outputs.

6. The interface circuit arrangement as recited in claim 5, wherein the memory unit further includes an address enable input connected to receive said second clock pulse train.

7. The interface circuit arrangement as recited in claim 6, wherein said memory unit is a read only memory.

8. The interface circuit arrangement as recited in claim 4, wherein said means for forming a serial stream of transformed data comprise a parallel to series converter having m parallel inputs connected to receive consecutively said second data words, and having a serial output furnishing said transformed data stream.

9. The interface circuit arrangement as recited in claim 8, wherein said means for forming a serial data stream of transformed data further comprise means for generating a third clock pulse train having a third pulse frequency substantially identical to the frequency of the transformed data stream, said third clock pulse generating means being connected to furnish output control pulses to said parallel to series converter.

10. The interface circuit arrangement as recited in claim 9, wherein said means for forming a serial data stream of transformed data further comprise means for generating a fourth clock pulse train having a fourth clock pulse frequency being equal to 1/mth of the third clock pulse frequency, said fourth clock pulse generating means being connected to said parallel to series converter for supplying input control pulses.

11. The interface circuit arrangement as recited in claim 2, for cooperation with facsimile having a horizontal resolution of 1728 bits and 1400 bits, respectively per scanning line, wherein variable n has a value of 5 and variable m has a value of 4.

* * * * *